United States Patent
Philipp et al.

(10) Patent No.: US 9,250,751 B2
(45) Date of Patent: *Feb. 2, 2016

(54) TOUCH SENSITIVE SCREEN

(75) Inventors: Harald Philipp, Zug (CH); Samuel Brunet, Southhampton (GB)

(73) Assignee: Atmel Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/093,685

(22) Filed: Apr. 25, 2011

(65) Prior Publication Data

US 2011/0199333 A1 Aug. 18, 2011

Related U.S. Application Data

(63) Continuation of application No. 11/532,560, filed on Sep. 18, 2006, now Pat. No. 7,932,898.

(60) Provisional application No. 60/722,477, filed on Sep. 30, 2005.

(30) Foreign Application Priority Data

Sep. 20, 2005 (GB) .................................. 0519170.5

(51) Int. Cl.
 *G06F 3/041* (2006.01)
 *G06F 3/044* (2006.01)

(52) U.S. Cl.
 CPC ...................................... *G06F 3/044* (2013.01)

(58) Field of Classification Search
 CPC ........ G06F 3/041; G06F 3/0412; G06F 3/044
 USPC ......... 345/173–179; 178/18.01, 18.03, 18.05, 178/18.06
 See application file for complete search history.

(56) References Cited

U.S. PATENT DOCUMENTS

| | | | |
|---|---|---|---|
| 4,379,287 A | 4/1983 | Tyler | |
| 4,550,221 A | 10/1985 | Mabusth | |
| 6,137,427 A | 10/2000 | Binstead | |
| 6,188,391 B1 | 2/2001 | Seely | |
| 7,154,481 B2 * | 12/2006 | Cross et al. | 345/173 |
| 7,190,352 B2 * | 3/2007 | Ling et al. | 345/173 |
| 7,663,607 B2 | 2/2010 | Hotelling | |

(Continued)

FOREIGN PATENT DOCUMENTS

| | | |
|---|---|---|
| DE | 3730899 | 5/1973 |
| GB | 2428306 A | 1/2007 |

(Continued)

OTHER PUBLICATIONS

UK Intellectual Property Office, Combined Search and Examination Report in equivalent UK application, Jul. 4, 2007.

(Continued)

*Primary Examiner* — Regina Liang
(74) *Attorney, Agent, or Firm* — Baker Botts L.L.P.

(57) ABSTRACT

One embodiment provides a capacitive sensor for determining the presence of an object, such as a user's finger or a stylus. The sensor includes a substrate on which electrodes are deposited. A resistive drive electrode is arranged on one side of the substrate and a resistive sense electrode is arranged on the other side of the substrate. A shorting connection connects between two locations on one of the electrodes. The electrodes are connected to respective drive and sense channels.

21 Claims, 9 Drawing Sheets

(56) References Cited

U.S. PATENT DOCUMENTS

| | | |
|---|---|---|
| 7,875,814 B2 | 1/2011 | Chen |
| 7,920,129 B2 | 4/2011 | Hotelling |
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,179,381 B2 | 5/2012 | Frey |
| 2004/0119701 A1* | 6/2004 | Mulligan et al. ............... 345/173 |
| 2005/0151727 A1 | 7/2005 | Kwong |
| 2007/0008299 A1 | 1/2007 | Hrsitov |
| 2009/0315854 A1 | 12/2009 | Matsuo |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |

FOREIGN PATENT DOCUMENTS

| | | |
|---|---|---|
| WO | 0044018 A1 | 7/2000 |
| WO | WO 2012/129247 | 9/2012 |

OTHER PUBLICATIONS

Office Action for German Application No. 102006043665.2, Nov. 16, 2009.

U.S. Appl. No. 61/454,936, filed Mar. 21, 2011, Myers.

U.S. Appl. No. 61/454,950, filed Mar. 21, 2011, Lynch.

U.S. Appl. No. 61/454,894, filed Mar. 21, 2011, Rothkopf.

* cited by examiner

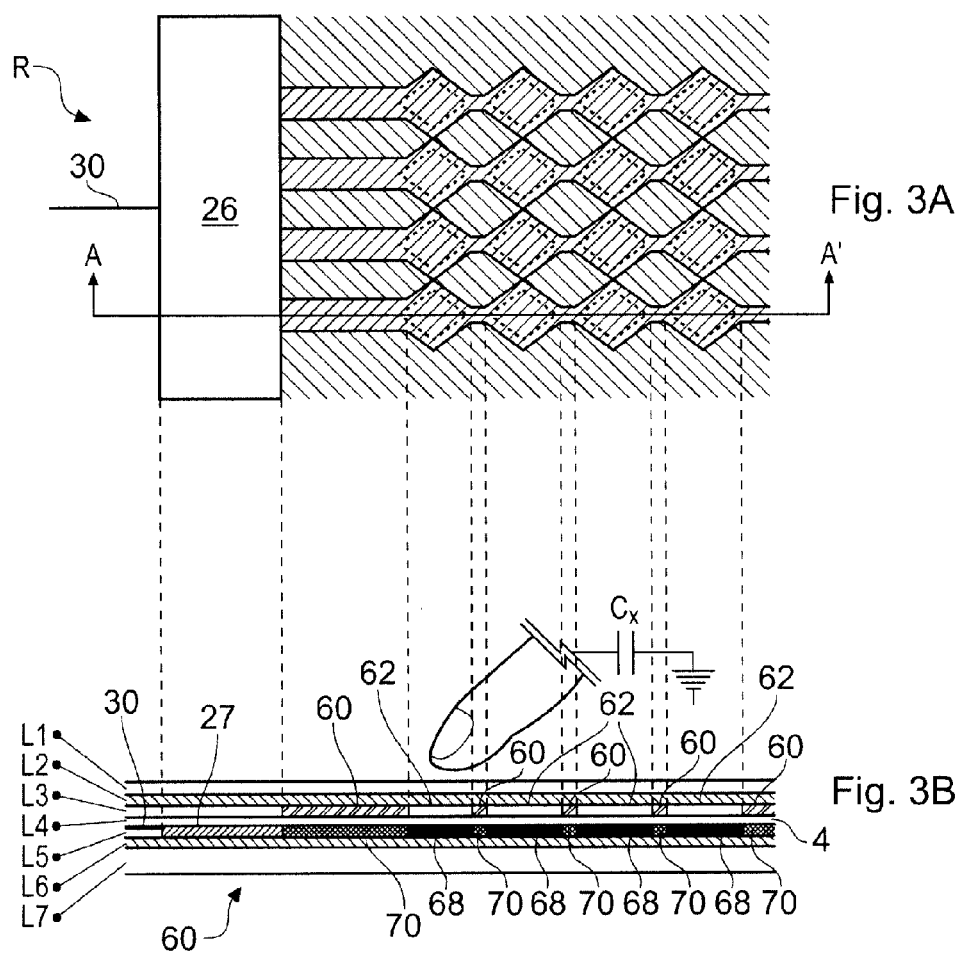
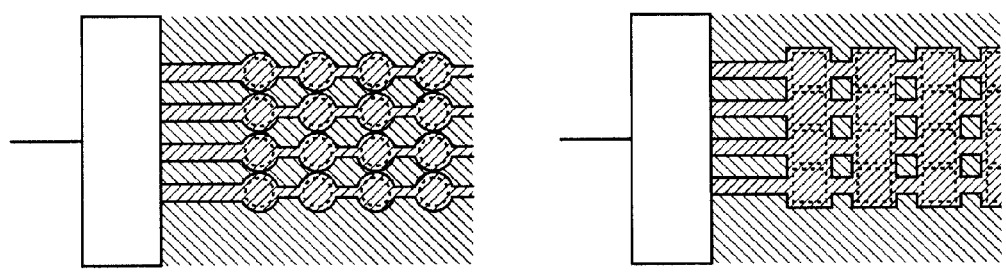
Fig. 4A
Fig. 4B

TOUCH SENSITIVE SCREEN

RELATED APPLICATIONS

This application is a continuation, under 35 U.S.C. §120, of U.S. patent application Ser. No. 11/532,560, filed 18 Sep. 2006. U.S. patent application Ser. No. 11/532,560 claims the benefit, under 35 U.S.C. §119(e), of U.S. Provisional Patent Application No. 60/722,477, filed 30 Sep. 2005, and also claims the benefit, under 35 U.S.C. §119(a) of U.K. Patent Application No. 0519170.5, filed 20 Sep. 2005.

TECHNICAL FIELD

This disclosure generally relates to touch sensors.

BACKGROUND OF THE INVENTION

The invention relates to a capacitive touch sensor for detecting the presence of an object within a sensing area.

The use of touch-sensitive sensors is becoming more common. Examples include the use of touch sensors in laptop computers in place of mouse pointing devices and as control panels for receiving user inputs to control a device or appliance, both domestic and portable.

Touch-sensitive sensors are frequently preferred to mechanical devices because they provide a more robust interface and are often considered to be more aesthetically pleasing. In addition, because touch-sensitive sensors require no moving parts to be accessible to a user, they are less prone to wear than their mechanical counterparts and can be provided within a sealed outer surface. This makes their use where there is a danger of dirt or fluids entering a device being controlled particularly attractive. Furthermore, unlike mechanical interfaces, touch sensitive sensors can be made transparent. There is an increasing desire to provide transparent sensors because these can be used over a display to provide a touch sensitive screen which is capable of displaying information to a user and responding to a user pointing to particular areas of the display.

A known two dimensional position sensor is described by the present inventor in WO 00/44018. This position sensor comprises an array of N by M touch keys. Each key corresponds to an intersection between a drive electrode and a sense electrode. An electrical drive signal is applied to the drive electrode. The degree of capacitive coupling of this drive signal to the sense electrode is determined by measuring the amount of charge transferred to the sense electrode in response to changes in the drive signal. The degree of capacitive coupling between the electrodes at a given key is dependant on the presence of objects in the vicinity of that key since these will modify the electric field pattern between the electrodes. Some objects, e.g. conductive water films, will increase the capacitive coupling. Other objects, e.g. a human having a significant capacitive coupling to ground, will decrease the capacitive coupling. This is because charge can be sunk to ground through the adjacent object, rather than through the sense electrode.

The array of keys described in WO 00/44018 is a matrixed array. This means a single drive electrode is associated with the keys in a given column and a single sense electrode is associated with the keys in a given row. This reduces the number of drive and sense channels required since a single drive channel simultaneously drives all of the keys in a given column and a single sense channel senses all of the keys in a given row. The capacitive coupling between the electrodes at the positions of the different keys can be determined by driving the appropriate column and sensing the appropriate row. For example, to determine the capacitive coupling between the electrodes associated with a key at the intersection of column 2 and row 3, the drive signal is applied to the drive electrode of column 2 while the sense channel associated with the sense electrode of row 3 is active. The output from the active sense channel reflects the capacitive coupling between the electrodes associated with the key under investigation. It does not matter that the drive signal is applied to other keys in column 2 because the rows associated with these keys are not being sensed. Similarly, it does not matter that the other keys in row 3 are being sensed because these keys are not being driven. In this way the different keys can be scanned by sequencing through different combinations of drive and sense channels.

The two dimensional position sensor described in WO 00/44018 is a robust and efficient device. However, an important feature of this type of position sensor which contributes to its good performance is the fact that during the transfer of charge from the driven electrode to the sensing electrode, the sensing electrode should appear as a virtual ground. Each sense channel includes a charge detector for determining the amount of charge transferred in response to the changing drive signal (i.e. the degree of AC capacitive coupling). It is important that the sense electrode presents a low impedance node because this allow charge to be efficiently sunk to the charge detector. If the sense electrode does not present a low input impedance, charge flows induced in the sense channel by the changing drive signal appear as voltage pulses on the sense electrode. This makes the sensor susceptible to 'walk-by' interference from objects near to the wiring connecting between the sense electrode and the charge detector. This is because an object near the wiring can absorb some of the signal from the wiring connection and so reduce the signal supplied to the charge detector. This can appear to the control circuitry as a reduction in capacitive coupling at the key (i.e. a detection event), even though the object is adjacent the wiring rather than near the sense electrode. Thus a hand reaching across the wiring of one row of electrodes to activate a key in another row can lead to an erroneous output. Furthermore, if the sense channel has significant input impedance the length of wiring used in the sensor becomes a factor in determining the gain of the circuit. This is because the wiring will cause some of the sense signal to "bleed off" capacitively into free space, adjacent wires, and ground, thus forming a capacitance divider circuit together with the capacitance coupling between the key.

The low impedance characteristic of the charge detection circuitry used in WO 00/44018 means that the above identified problems are reduced. However, a problem arises in the context of transparent touch sensors since most transparent conductors of electricity that can be used to form the drive and sense electrodes in a position sensor of the kind described in WO 00/44018 (e.g., Indium Tin Oxide (ITO)) are highly resistive compared to copper wiring. For example, 300 ohms per square is customary in optimally transparent ITO films. This means unlike materials such as copper, transparent conductors cannot generally be formed into electrodes and associated wiring having negligible resistance (at least for thicknesses at which they remain substantially transparent). Thus even if the charge detection circuitry itself presents a suitably low impedance, the material comprising the columns of drive electrodes and the rows of sense electrodes themselves (and any associated wiring traces made of the same material) may not. Thus devices of the type described in WO 00/44018 in which the electrodes are to be formed by a resistive conductor (e.g. transparent conductors) are difficult to implement reliably.

Furthermore, of considerable importance in many touch panel designs is the parallel ability to sense capacitive touch keys adjacent a touch screen area. These kinds of panel keys are substantially described in WO 00/44018 in conjunction with touch buttons on a dielectric surface, using copper or other metallic, low resistance wiring. The desire to incorporate both low resistance wiring with high resistance clear-conductor wiring can create circuit design problems, usually necessitating the use of two different types or performances of capacitive circuits.

SUMMARY OF THE INVENTION

According to a first aspect of the invention there is provided a capacitive sensor comprising: a substrate; a resistive first electrode on one side of the substrate; a resistive second electrode on the other side of the substrate; and a shorting connection configured to connect between at least two locations on the first electrode.

The sensor may be operated as an active or a passive sensor. Where the sensor is operated as an active sensor, the provision of the shorting connection helps reduce the impedance presented by the electrodes to drive signals applied to one or other of the first and second electrodes. This allows charge to be more efficiently coupled through the sensor and so reduces voltage differences between the respective electrodes and associated circuitry. This means the effects of walk-by interference that can normally arise when a sensor does not present a low impedance node to a drive signal can be reduced. Thus if the substrate and the electrodes are transparent, a transparent sensor can be provided with reduced sensitivity to walk-by interference, notwithstanding the fact that the electrodes are resistive. Where the sensor is operated as a passive sensor (e.g. with sense channels coupled to both the first and second electrodes), the reduction in impedance of the electrodes due to the provision of the shorting connection similarly reduces the effects of walk-by interference.

In general the first electrode (i.e. the one associated with the shorting connection) will be the electrode having the greatest overall resistance. This will depend on the arrangement of the resistive material forming the respective electrodes. However, the sensor may comprise a further shorting connection configured to connect between two locations on the other electrode if desired (i.e. such that a shorting electrode is provided for both the first and second electrodes).

The electrodes may be arranged in a pattern so as to provide an array of open regions on one side of the substrate and an array of filled regions on the other side, the filled region being arranged to align with the open regions. This allows electric fields to spill out from the region between the electrodes. This allows an object that modifies the electrical properties within the region of the spilled field (for example by providing a virtual earth) to change the capacitive coupling between the electrodes and so be detected.

In the case of an active sensor, the sensor may be provided with associated circuitry which comprises a drive channel operable to apply electrical drive signals to one of the first or second electrodes (which may thus be referred to as a drive electrode) and a sense channel operable to detect (sense) electrical signals induced in the other of the first and second electrodes in response to drive signals (which may thus be referred to as a sense electrode).

The drive channel may comprise a switch element operable to selectively connect the drive electrode to a voltage source and to disconnect it therefrom. The sense channel may comprise a charge transfer circuit.

In the case of a passive sensor, the sensor may be provided with associated circuitry which comprises sense channels operable to detect changes in the capacitance of the respective electrodes to ground.

The sensor may comprise more than one electrode on the side of the substrate having the first electrode and/or more than one electrode on the side of the substrate having the second electrode, thus providing multiple sensor areas (keys).

Where more than one electrode are provide on one or other side of the substrate, the electrodes may be arranged in a matrix array to allow circuitry elements (e.g., the drive and sense channels of an active sensor) associated with the electrodes to serve more than one key.

According to a second aspect of the invention there is provided a control panel comprising the sensor of the first aspect of the invention and a cover panel overlying the sensor. This allows the sensor to be protected during use.

The control panel may further comprise at least one low-resistance electrode, for example formed of copper, for providing a conventional capacitive touch sensitive key in association with the sensor of the first aspect of the invention. A single controller may be used to govern the operation of the sensor of the first aspect of the invention and the conventional capacitive touch sensitive key.

The cover panel and the sensor may be attached to one another by a refractive index matching adhesive. This can help maintain optical transparency where the sensor and cover panel are transparent.

Furthermore, the control panel may comprise a display screen underlying the sensor. Thus a touch sensitive display screen may be provided. The display screen and the sensor may also be attached to one another by a refractive index matching adhesive.

According to a third aspect of the invention there is provided an apparatus comprising the control panel of the second aspect of the invention.

BRIEF DESCRIPTION OF THE DRAWINGS

For a better understanding of the invention and to show how the same may be carried into effect reference is now made by way of example to the accompanying drawings in which:

FIG. 3A schematically shows in plan view a region of the sensor shown in FIG. 2 on a magnified scale;

FIG. 3B schematically shows in section view the portion of the sensor shown in FIG. 3A;

FIGS. 4A and 4B schematically show plan views of portions of sensors according to other embodiments of the invention;

DETAILED DESCRIPTION

Figure 1A:
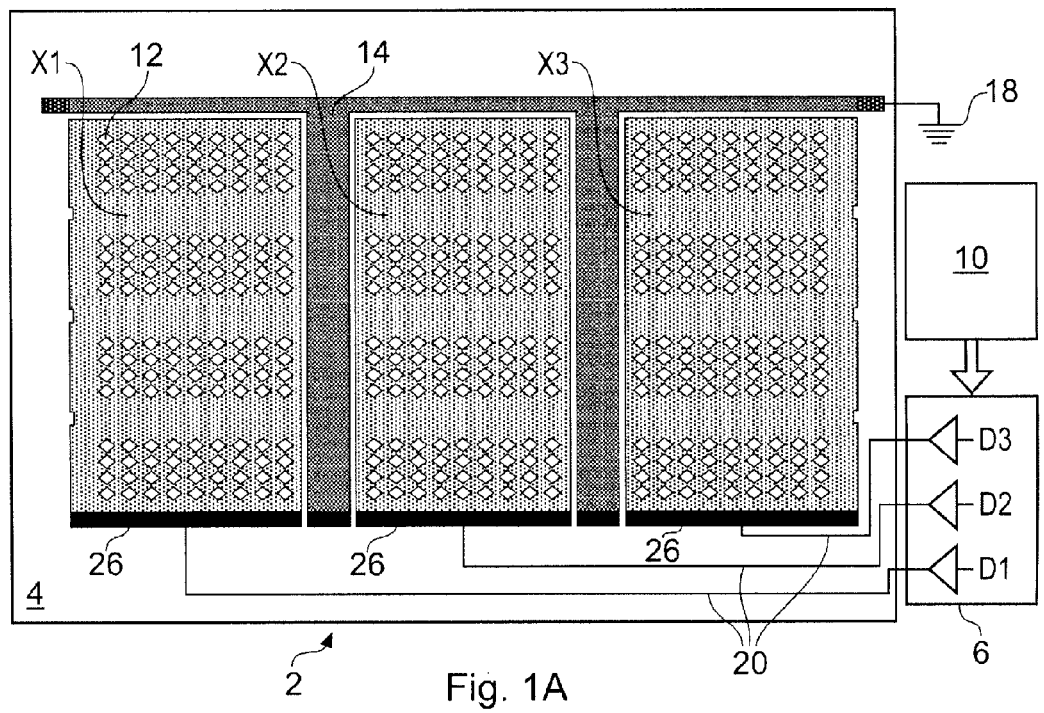
FIGS. 1A and 1B schematically show respective front and rear plan views of a two dimensional capacitive position sensor according to an embodiment of the invention.
Figure 1B:
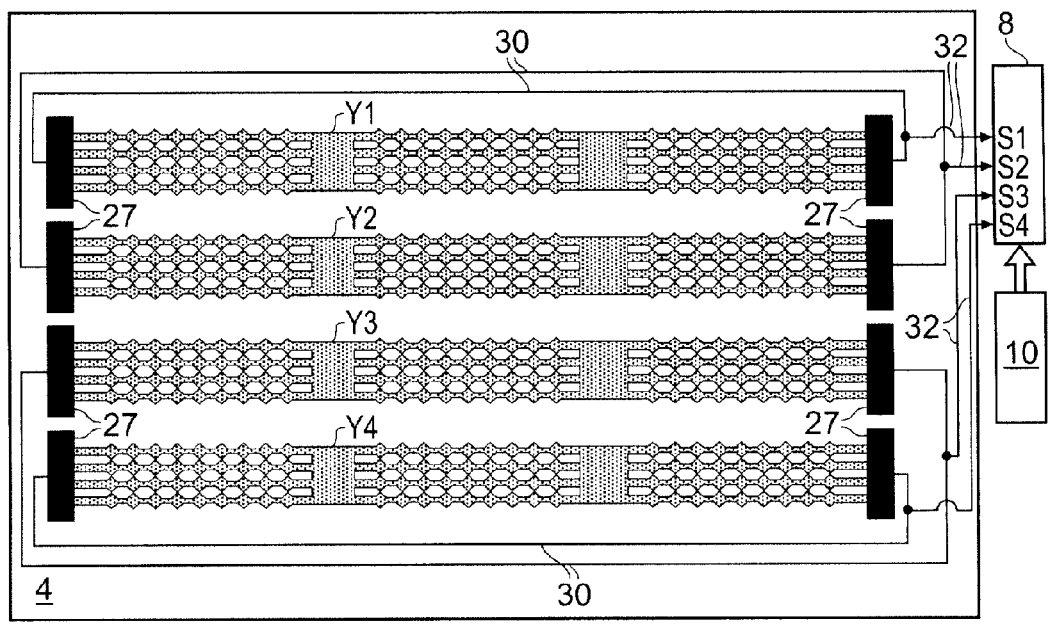

FIGS. 1A and 1B schematically show respective front and rear plan views of a two dimensional capacitive position sensor 2 according to an embodiment of the invention. The terms front and rear are used for convenience to refer to opposing sides of the sensor 2 and are not intended to refer to any particular spatial orientation. The term front is used to identify the side of a sensor which typically faces an object to be sensed when the sensor is in normal use. It will be appreciated however that in many cases the sensor is reversible.

The sensor 2 comprises a substrate 4 having a patterning of electrodes deposited on both sides which together define a sensitive area of the sensor. The patterning of the electrodes on the substrate can be achieved using conventional techniques. The substrate 4 is of a transparent plastics material, in this case Polyethylene Terephthalate (PET). The electrodes are of a transparent conductive material, in this case ITO. Thus the sensitive area as a whole is transparent and may be used over an underlying display without obscuration. The sensor additionally comprises a drive unit 6 for supplying drive signals to electrodes on one side, in this case the front side, of the substrate 4 (FIG. 1A) and a sense unit 8 for sensing signals from the electrodes on the other side of the substrate 4, in this case the rear side (FIG. 1B). The sensor 2 further comprises a sensor controller 10 coupled to both the drive unit 6 and the sense unit 8. The sensor controller 10 controls the operation of the drive and sense units and processes responses from the sense unit to determine the position of an object adjacent the sensor. The drive unit 6, sense unit 8 and sensor controller 10 are shown schematically in FIGS. 1A and 1B as separate elements. However, in general the functionality of these elements will be provided by a single integrated circuit chip, for example a suitably programmed general purpose microprocessor or field programmable gate array, or an application specific integrated circuit.

The electrode patterning of the front side of the substrate (FIG. 1A) comprises three "column" electrodes X1, X2 and X3. These run vertically and are spaced apart from each other horizontally for the orientation shown in FIG. 1A. (The terms vertical and horizontal, top and bottom, and so on as used herein refer to the orientation of the sensor 2 shown in FIGS. 1A and 1B unless the context demands otherwise. The terms are not intended to refer to any particular orientation of the sensor when it is in normal use. Furthermore, the terms column and row will generally be used to conveniently refer to vertical and horizontal alignments). Each column electrode X1, X2, X3 is formed from an electrically continuous area of ITO having a plurality of diamond-shaped open regions formed therein (i.e. regions where there is no ITO present on this side of the substrate). The open regions in each one of the column electrodes are arranged into four vertically displaced horizontal bands with each band comprising four rows and nine columns of openings. The electrode patterning on this side of the substrate also includes a ground shield 14. This is formed from a continuous region of ITO that runs horizontally along a top edge of the column electrodes and extends into the areas between them. The ground shield is connected to a system ground 18 (i.e. a system reference potential). The ground shield can help to reduce cross-talk between the different column electrodes during use, but may be omitted if desired.

The column electrodes X1, X2, X3 are connected via drive wires 20 to respective drive channels D1, D2, D3 in the drive unit 6. Thus the column electrodes are sometimes referred to as driven or drive electrodes. In this example a separate drive channel is provided for each column electrode. However, a single drive channel with appropriate multiplexing may also be used. The drive channels are controlled by the controller 10 to apply drive signals to respective ones of the column electrodes as described further below. The drive wires comprise conventional copper wiring (e.g. ribbon connectors) connected to the ITO column electrodes via carbon pads 26. The drive wires 20 are shown schematically in FIG. 1A and in general better performance can be achieved if the drive wires associated with the different electrodes are of similar lengths since this can help to minimize differences in performance between channels. In some examples the drive wires may be also formed from ITO traces on the substrate connected to the drive channels through an edge connector. However, in general conventional wiring will have the advantage of providing lower resistance drive wires.

The electrode patterning of the rear side of the substrate (FIG. 1B) comprises four "row" electrodes Y1, Y2, Y3, Y4 which run horizontally and are spaced apart from each other vertically. Each row electrode Y1, Y2, Y3, Y4 is formed from an electrically continuous area of ITO. The row electrodes Y1, Y2, Y3, Y4 are formed such that each one comprises a pattern that is repeated three times along its length in association with the three column electrodes X1, X2, X3 on the opposing side of the substrate 4. The repeat pattern comprises four sub-rows of ITO which are aligned with respective ones of the four rows of diamond-shape open regions in a corresponding one of the four bands of open regions in the ITO forming the column electrodes. Each of the sub-rows includes nine filled regions where the ITO forming the row fills out into diamond shapes which correspond to and align with respective ones of the open regions on the opposing side of the substrate. In this case the filled regions from one sub-row just contact the filled regions from the neighboring sub-row, but this is not significant. The ends of each row electrode are connected together by low-resistance shorting connections 30 provided by wiring which runs external to the sensitive area via carbon pads 27. In this example the shorting connections 30 comprise conventional copper wiring (e.g. ribbon connectors) coupled to the ends of the respective row electrodes via the carbon pads 27.

The row electrodes Y1, Y2, Y3, Y4 are connected via sense wires 32 to respective sense channels S1, S2, S3, S4 in the sense unit 8. Thus the row electrodes are sometimes referred to as sense electrodes. In this example a separate sense channel is provided for each row electrode, but as with the drive channels, a single sense channel with appropriate multiplexing could also be used. The sense channels are controlled by the controller 10 to measure response signals from respective ones of the row electrodes as described further below. The sense wires 32 comprise conventional copper wiring connected to the shorting connections 30. Thus the sense channels are connected to both ends of their respective row electrodes through low-resistance connections provided by a combination of the sense wires and the shorting connections.

It will be understood that the particular configuration shown in FIG. 1B which uses shorting connections 30 between the respective row electrode ends and sense wires 32 connecting the shorting connections to the sense channels is only one way of connecting the sense channels to both ends of the respective row electrodes. For example, the same result could be achieved using connections running directly from each of the sense channels to the two ends of the associated row electrodes.

As with the drive wires 20 shown in FIG. 1A, the sense wires 30 are shown schematically and in general better performance can be achieved if the wiring associated with the different electrodes is of a similar length to help minimize differences in performance between channels. In some examples the connections between the sense channels and the ends of the row electrodes may be wholly or partially formed from traces on the substrate. It is possible to do this by forming the traces from ITO (perhaps made thicker than in the transparent area of the sensor to reduce their resistance), but it will generally be advantageous to use silver ink traces since these will generally have lower resistance. However, in this case conventional copper wiring is used to connect the sense channels to the row electrodes and this also have the advantage of providing lower resistance connections than would generally be obtainable using ITO.

Figure 2:
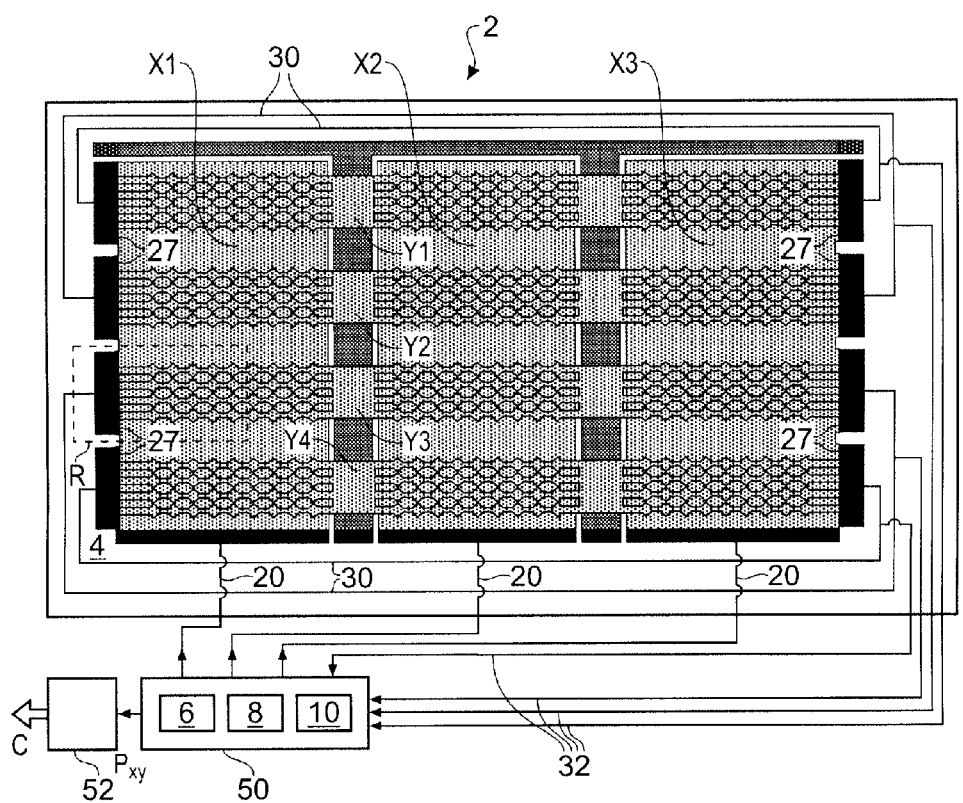
FIG. 2 schematically shows together the front and rear plan views of the sensor shown FIGS. 1A and 1B.

FIG. 2 schematically shows a plan view of the sensor 2 shown in FIGS. 1A and 1B in which the electrode patterning on both the front side (FIG. 1A) and the read side (FIG. 1B) are shown together. The electrode patterning on the rear side of the substrate is shown as being on top in this figure (i.e. the view is from "behind" the substrate). This figure shows how the filled diamond-shaped regions in the electrode rows on the rear side (FIG. 1B) overlay the opposing openings in the column electrodes on the front side (FIG. 1A). In FIG. 2, the drive unit 6, the sensor unit 8 and the sensor controller 10 are shown as sub-units of a single micro-controller 50 that provides the functionality of all three of these elements. Also shown is a device controller 52 that receives position information from the sensor controller (i.e. a signal $P_{xy}$ indicative of a calculated position of a sensed object within the sensing area), and takes appropriate action in response to the measured position to control a device associated with the sensor by outputting control signals C.

FIG. 3A schematically shows a magnified portion of the sensor shown in FIG. 2. In particular, the region of the sensor marked by dashed line R in FIG. 2 is shown. FIG. 3A more clearly shows how each of the diamond-shaped filled regions in the electrode rows on the rear side of the substrate (FIG. 1B) are aligned with corresponding ones of the diamond-shaped open regions in the column electrodes on the front side (FIG. 1A). The open regions in the column electrodes are schematically shown in dashed outline as being slightly smaller than they are in relation to the diamond-shaped filled regions in the row electrodes so that they are more clearly seen in the figure. In practice, the filled regions and the corresponding open regions would be arranged to have substantially the same extent so that they more closely overlapped.

FIG. 3B schematically shows a section view of the region of the sensor 2 shown in FIG. 3A taken along the line AA'. The section view also shows other elements which are combined with the sensor 2 to provide a touch sensitive display 60 and also an object (in this case a user's finger having a capacitance Cx to ground) whose position is to be sensed. The section view of FIG. 3B is shown with the front side of the sensor 2 uppermost.

FIG. 3B shows the touch sensitive display 60 to comprise several layers and these are labeled L1 to L7 from the user-side downwards. The sensor elements described above comprise layers L3, L4 and L5. Layer L4 is the substrate and layers L3 and L5 are the depositions of ITO on the front and rear sides of the substrate respectively. Layer L5 (rear—FIG. 1B) shows the carbon pad 27 for connecting the row electrode to the shorting connection 30. Adjacent this there is a continuous section of ITO running along the row electrode at the location through which the section AA' is taken. This continuous section of ITO is schematically shown as alternating solid-shaded sections 68 and cross-hatched sections 70. The solid shaded sections 68 correspond to the diamond-shaped filled regions and the cross-hatched sections 70 correspond to the portions of the sub-row of the row electrode through which the section is taken that connect between the diamond-shaped filled regions. Layer L3 shows the ITO deposition pattern on the front side of the substrate shown in FIG. 1A. The section view shown in FIG. 3B passes through a number of the diamond-shaped open regions such that layer L3 is seen to comprise alternating sections of hatched regions 60 where ITO is present and un-shaded regions 62 where there is no ITO on this side of the substrate. It can clearly be seen from FIG. 3B that the diamond-shaped filled regions on the rear side of the substrate 4 (layer L5) align with the diamond-shaped open regions on the front side.

Layer L1 of the touch sensitive display 60 is a cover panel, e.g. of a glass or plastics material, which protects the sensor during use. The cover panel may include graphic decals as desired. Layer L2 is an adhesive layer which bonds the sensor 2 to the cover panel. Layer L7 is a display screen, for example a liquid crystal display panel. Layer L6 is an adhesive layer that bonds the sensor (and attached cover panel) to the display screen. It can be beneficial for the respective adhesive layers to index match the ITO and the cover panel/display screen cover to improve transparency.

Each of the intersections between a row electrode and a column electrode can be considered to correspond to a discrete sensor area (key) of the position sensor 2. Thus the position sensor 2 comprises twelve keys arranged into four rows and three columns. In use the sensor may be operated in a manner which is similar to that described in WO 00/44018, the contents of which are incorporated herein by reference. Whether or not an object is adjacent a given key is determined by examining the capacitive coupling between the column electrode and the row electrode that intersect to define that key. Thus to determine whether an object is adjacent the top-left key shown in FIG. 2, the drive channel D1 associated with column electrode X1 and the sense channel S1 associated with row electrode Y1 are activated.

When activated, the drive channel D1 applies a time-varying drive signal to the column electrode X1. The drive channel D1 may be a simple CMOS logic gate powered from a conventionally regulated supply and controlled by the sensor controller 10 to provide a periodic plurality of voltage pulses of a selected duration (or in a simple implementation a single transition from low-to-high or high-to-low voltage). Alternatively, the drive channel may comprise a sinusoidal generator or generator of a cyclical voltage having another suitable waveform. A changing electric field is thus generated on the rising and failing edges of the train of voltage cycles applied to the driven column electrode X1. The column electrode X1 and the row electrode Y1 act as opposing plates of a capacitor having a capacitance $C_E$. The capacitance $C_E$ is primarily governed by the region of overlap between the column electrode X1 and the row electrode Y1 (i.e. at the position of the key defined by the intersection of these electrodes). This is because this is where the electrodes are at their closest. Thus the row electrode Y1 is capacitively coupled to the driven column electrode X1 and so receives or sinks the changing electric field generated by the driven column electrode. This results in a current flow in the row electrode Y1 induced by the changing voltage on the driven column electrode X1 through capacitive differentiation of the changing electric fields. The current will flow towards (or from, depending on polarity) both ends of the row electrode Y1 and to (from) the sense channel S1 in the sense unit 8 via the appropriate shorting connection 30 and sense wire 32. The sense channel comprises a charge measurement circuit configured to measure the flow of charge into/out of (depending on polarity) the sense channel caused by to the currents induced in the row electrode Y1.

The capacitive differentiation occurs through the equation governing current flow through a capacitor, namely:

$$I_E = C_E \times dV/dt$$

where $I_E$ is the instantaneous current in the sense wire 32 and dV/dt is the rate of change of voltage applies to the driven column electrode X1. The amount of charge coupled to the row electrode Y1 (and so into/out of the sense channel S1) during an edge transition is the integral of the above equation over time, i.e.

$$Q_E = C_E \times V.$$

The charge coupled on each transition, $Q_E$, is independent of the rise time of V (i.e. dV/dt) and depends only on the voltage swing at the driven column electrode (which may readily be fixed) and the magnitude of the coupling capacitance $C_E$ between the driven column electrode and sense row electrode. Thus a determination of the charge coupled into/out of charge detector comprising the sense channel S1 in response to changes in the drive signal applied to the column electrode X1 is a measure of the coupling capacitance $C_E$ between the driven column electrode X1 and sense row electrode Y1.

The capacitance of a conventional parallel plate capacitor is almost independent of the electrical properties of the region outside of the space between the plates (at least for plates that are large in extent compared to their separation). However, the combination of the diamond-shaped open regions in the column electrode and the gaps in the ITO between the different sub-rows in the row electrodes means that at least some of the electric fields connecting between the column electrode X1 and the row electrode Y1 "spill" out from the substrate. This means the capacitive coupling (i.e. the magnitude of $C_E$) between the driven column electrode and the sense row electrode is to some extent sensitive to the electrical properties of the region in the vicinity of the intersection of the electrodes (i.e. at the location of the key) in to which the "spilled" electric field extends.

In the absence of any adjacent objects, the magnitude of $C_E$ is determined primarily by the geometry of the column and row electrodes (taking account of their respective openings) in their region of overlap, and the thickness and dielectric constant of the substrate 4. However, if an object is present in the region into which the electric field spills through the gaps in the ITO and beyond the cover panel comprising layer L1 in FIG. 3B, the electric field in this region may be modified by the electrical properties of the object. This causes the capacitive coupling between the electrodes to change, and thus the measured charge coupled into/from the charge detector comprising the sense channel changes. For example, if a user places a finger in the region of space occupied by some of the of the spilled electric fields, the capacitive coupling of charge between the electrodes will be reduced because the user will have a substantial capacitance to ground (or other nearby structures whose path will complete to the ground reference potential of the circuitry controlling the sense elements). This reduced coupling occurs because the spilled electric field which is normally coupled between the driven column electrode and sense row electrode is in part diverted away from the row electrode to earth. This is because the object adjacent the sensor acts to shunt electric fields away from the direct coupling between the electrodes.

Figure 3C:
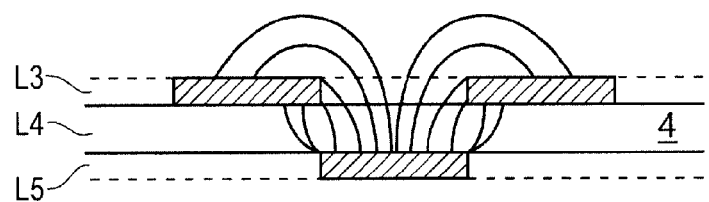
FIGS. 3C and 3D schematically show section views of portions of the sensor shown in FIG. 3B with overlaying electric field lines.
Figure 3D:
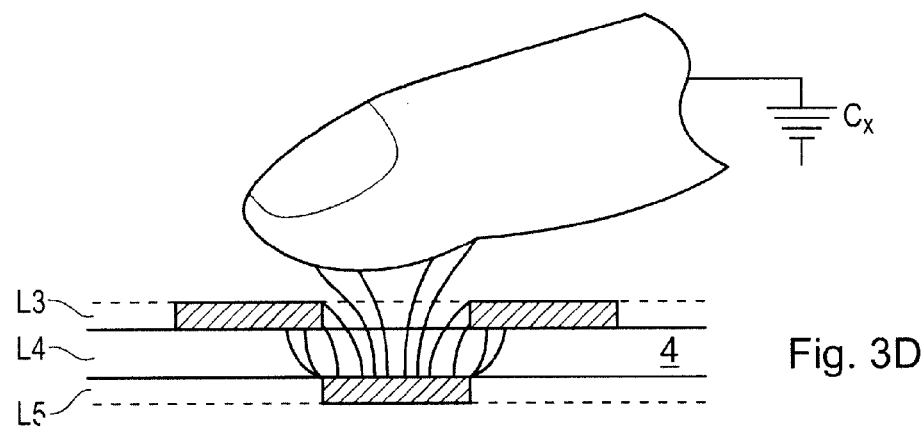

FIGS. 3C and 3D schematically show section views of a region of the sensor 2 in which the electric field lines connecting between the drive and sense electrodes are schematically shown. These figures are similar to and will be understood from FIG. 3B, but for simplicity only portions of layers L3 (front ITO), L4 (substrate) and L5 (rear ITO) are shown. FIG. 3C shows the electric fields when there is no object adjacent the sensor. FIG. 3D shows the electric fields when there is an object adjacent the sensor (i.e. user's finger having a capacitance $C_x$ to ground). When there is no object adjacent the sensor, all of the electric field lines connect between the two electrodes. However, when the user's finger is adjacent the sensor, some of the electric field lines that pass outside of the substrate are coupled to ground through the finger. Thus fewer field lines connect between the electrodes and the capacitive coupling between them is reduced. The effect is similar to that employed in U.S. Pat. No. 5,648,642.

Thus by monitoring the amount of charge coupled between the driven column electrode X1 and the sense row electrode Y1, changes in the amount of charge coupled between them can be identified and used to determine if an object is adjacent the key (i.e. whether the electrical properties of the region into which the spilled electric fields extend have changed). For example, on initial start up of the sensor 2, the sensor controller 10 may make a measurement of the charge transferred between the column and row electrodes at each key location for a given drive signal. This may then be taken to be a reference signal level $S_{ref}$ for each key. During operation, the sensor controller may sequentially determine (i.e. scan) the capacitive coupling at each key location by activating appropriate column and row electrodes. The amount of measured charge transferred at each key $S_{meas}$ may then be compared with the reference signal level $S_{ref}$ for that key to determine whether it has changed significantly, e.g. whether it has changed by at least a predetermined threshold signal amount $S_{th}$. If the change is greater than $S_{th}$, the sensor controller determines that an object is adjacent the relevant key and indicates a detection event to the device controller 52 by outputting an appropriate signal $P_{xy}$ indicating the position of the object (i.e. adjacent which key it is positioned). The sensor controller may also examine the magnitude of the change in the amount of charge transferred at keys in the vicinity of the key displaying a change above the threshold so that the position of the touch can be interpolated to a resolution better than the size of the individual keys.

It will be appreciated that it is not necessary to scan the keys one at a time. If a separate sense channel is associated with each row electrode, all of the rows can be sensed at the same time as a single column electrode is driven such that all of the keys in a given column can be examined at the same time.

The sensitivity of the position sensor depends on the extent to which electric fields spill out from the region between the row and column electrodes (i.e. outside of the substrate 4). This is because this defines the extent to which the electrical properties of an object located adjacent the substrate (possibly through a cover panel) can modify the electric fields connecting between the driven column electrode and the receiving row electrode, and hence the capacitive coupling between them. In the example position sensor 2 described above, it is the driven column electrode side of the substrate which faces the user during normal use. Accordingly, it is the amount of electric fields starting or terminating (depending on polarity) on the diamond-shaped filled regions in the row electrodes which spills through the corresponding diamond-shaped open regions in the column electrodes that determines the sensitivity of the sensor. To improve sensitivity one would ideally select an electrode pattern on the user side of the substrate that has a relatively small area of ITO with a large fraction of the area taken up by open regions. However, while this might be possible with conventional non-transparent conductors, it is not possible with the more resistive transparent conductors because electrode structures which comprise only a sparse network of the resistive conductor material become too resistive. As explained above, if the output of the drive channel "sees" too much impedance, the reliability and response characteristics of the sensor can be significantly degraded. It is therefore important to find a balance between a dense pattern of ITO (providing low resistance electrodes) and an open pattern (providing good sensitivity).

It should be noted that although in the above example it is electric fields spilled through the diamond-shaped open regions in the column electrodes that are modified by an adjacent object, it is the row electrodes on the opposing side of the substrate that have the greatest resistance because they comprise narrower traces of ITO. Thus in this example it is the row electrodes that benefit most from the shorting connections. The column electrodes themselves comprise relatively broad section of ITO. However, the relatively large amounts of ITO on the front side of the substrate limit the geometry of the ITO patterning that can be applied to the rear of the substrate (i.e. the row electrodes). This is because it is important to reduce the area of the substrate that has ITO at the same location on opposite sides. This is because these regions of the electrodes are strongly capacitively coupled to each other and so reduce the amount of electric filed that can spill through the open regions. It is the need to minimize regions in which the ITO comprising the driven and sense electrodes is on both sides of the substrate that is at the heart of the need to strike a balance between a dense and an open pattern of the resistive conductor. The effect of the resistance of the row electrodes on the impedance presented to the drive channel can be reduced by connecting both ends of the row electrodes to the sense channel using low resistance wiring, for example using the shorting wires shown in FIG. 1B. If only one end of each row were to be connected to the sense channel, measurements of the capacitive coupling associated with keys at the other end would be affected by the whole of the electrical resistance of the electrode. However, by connecting both ends of the electrode to the sense channel, the current flows associated with the keys at both ends of the electrode have a relatively direct (i.e. low resistance) connection to the sense channel. Furthermore, the current flows from keys in the middle of the row electrodes can flow both ways along the electrodes to the sense channels. Thus the maximum contribution to the impedance of the sensor which arises from the electrode itself is reduced by a factor of four compared to the case that there is no shorting connection. This is because the point having the greatest resistance moves from one end to the middle of the electrode (thus halving the greatest resistance), and furthermore the two halves of the electrode connect the middle point to the measurement circuitry in parallel, thus halving again the greatest resistance. This allows position sensors based on resistive conductors (i.e. typically transparent conductors) on opposing sides of a substrate to be provided with sufficiently low electrode resistance that reliable position sensors can be provided. (It will be understood that if deemed necessary similar shorting connection wires could be used between the ends of the driven column electrodes.)

It will be appreciated that the diamond-shaped pattern is only one particular example of this type of electrode patterning and similar patterns based on, for example, circular or square regions, as shown schematically in FIGS. 4A and 4B (which are similar to and will be understood from FIG. 3A) and many other configurations can equally be used.

Figure 5A:
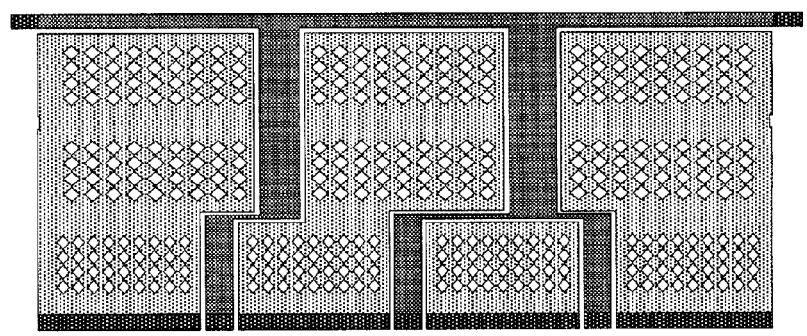
FIGS. 5A and 5B schematically show respective front and rear plan views of a two dimensional capacitive position sensor according to another embodiment of the invention.
Figure 5B:
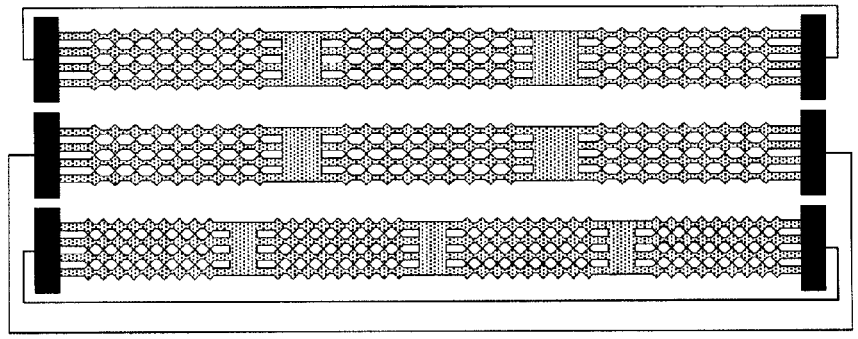

Furthermore, FIGS. 5A and 5B schematically show front and rear electrode patterns used in a sensor according to another embodiment of the invention. These figures are similar to and will be understood from FIGS. 1A and 1B. However, FIGS. 5A and 5B show a sensor having a different arrangement of keys. Rather than the four by three array of the sensor shown in FIGS. 1A and 1B, this sensor has two upper rows of three keys and a lower single row of four keys. The keys are based on a similar diamond-shaped pattern to that described above. The electrode patterning associated with the keys of the lower row are of a smaller scale but this is not significant. This embodiment shows one example of how a designer of a control panel according to the invention has a greet deal of freedom in determining how he would like the keys to be arranged.

Figure 6A:
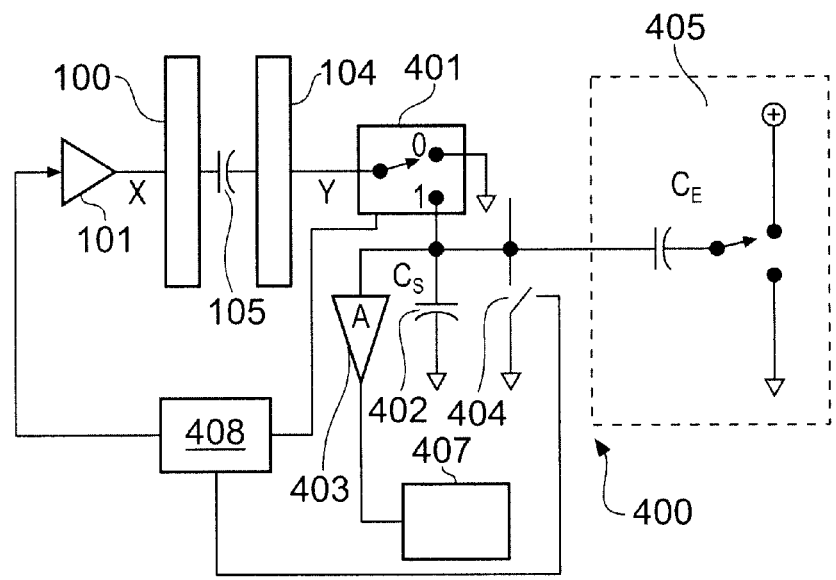
FIG. 6A schematically shows an electrical circuit for use with sensors according to embodiments of the invention.

FIG. 6A schematically shows a circuit which may be used to measure the charge transferred from a column electrode 100 to a sensing row electrode 104. Circuitry of this type is more fully described in WO 00/44018. The capacitive coupling between the column electrode 100 and the row electrode 104 is schematically shown as a capacitor 105. The circuit is based in part on the charge-transfer ("QT") apparatus and methods disclosed by the present inventor in U.S. Pat. No. 5,730,165, the contents of which are herein incorporated by reference.

Figure 6B:
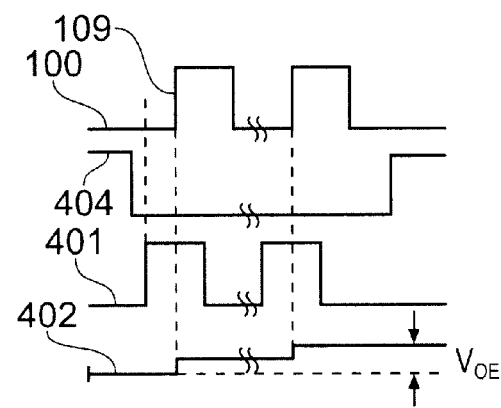
FIG. 6B schematically shows the timing relationship between some elements of the circuit shown in FIG. 6A.

The drive channel associated with column electrode 100, the sense channel associated with sensing row electrode 104 and elements of the sensor controller are shown as combined processing circuitry 400. The processing circuitry 400 comprises a sampling switch 401, a charge integrator 402 (shown here as a simple capacitor), an amplifier 403 and a reset switch 404, and may also comprise optional charge cancellation means 405. The timing relationships between the column electrode drive signal from the drive channel 101 and the sample timing of switch 401 is schematically shown in FIG. 6B. The drive channel 101 and the sampling switch 401 are provided with a suitable synchronizing means, which may be a microprocessor or other digital controller 408, to maintain this relationship. In the implementation shown, the reset switch 404 is initially closed in order to reset the charge integrator 402 to a known initial state (e.g., zero volts). The reset switch 404 is then opened, and at some time thereafter the sampling switch 401 is connected to charge integrator 402 via terminal 1 of the switch for an interval during which the drive channel 101 emits a positive transition, and thereafter reconnects to terminal 0, which is an electrical ground or other suitable reference potential. The drive channel 101 then returns to ground, and the process repeats again for a total of 'n' cycles, (where n may be 1 (i.e. 0 repeats), 2 (1 repeat), 3 (2 repeats) and so on). It is important that the drive signal does not return to ground before the charge integrator is disconnected from the row electrode since otherwise an equal and opposite charge would flow into/out of the sense channel during positive and negative going edges, thus leading to no net transfer or charge into the charge detector. Following the desired number of cycles, the sampling switch 401 is held at position 0 while the voltage on the charge integrator 402 is measured by a measurement means 407, which may comprise an amplifier, ADC or other circuitry as may be appropriate to the application at hand. After the measurement is taken, the reset switch 404 is closed again, and the cycle is restarted when next desired, e.g. instantaneously or after a delay appropriate to the device being controlled. The process is referred to herein as being a measurement 'burst' of length 'n'. where 'n' can range from 1 to any finite number. The circuit's sensitivity is directly related to 'n' and inversely to the value of the charge integrator 402.

It will be understood that the circuit element designated as 402 provides a charge integration function that may also be accomplished by other means, and that the invention is not limited to the use of a ground-referenced capacitor as shown by 402. It should also be self-evident that the charge integrator 402 can be an operational amplifier based integrator to integrate the charge flowing through in the sense circuitry. Such integrators also use capacitors to store the charge. It may be noted that although integrators add circuit complexity they provide a more ideal summing-junction load for the sense currents and more dynamic range. If a slow speed integrator is employed, it may be necessary to use a separate capacitor in the position of 402 to temporarily store the charge at high speed until the integrator can absorb it in due time, but the value of such a capacitor becomes relatively non-critical compared to the value of the integration capacitor incorporated into the operational amplifier based integrator.

It is helpful for the sampling switch 401 to connect the sensing row electrodes of the sensor to ground when they are not connected to the charge integrator 402 during the changes of drive signal of the chosen polarity (in this case positive going). This is because this can create an artificial ground plane, thus reducing RF emissions, and also, as noted above, permitting the coupled charge of opposite polarity to that being sensed by the charge integrator 402 to properly dissipate and neutralize. It is also possible to use a resistor to ground on the row electrode lines to accomplish the same effect between transitions of drive channels 101. As an alternative to a single SPDT switch 401, two independent switches can be used if timed in an appropriate manner.

As described by the present inventor in U.S. Pat. No. 5,730,165, there are many signal processing options possible for the manipulation and determination of a detection or measurement of signal amplitude. U.S. Pat. No. 5,730,165 also describes the gain relationship of the arrangement depicted in FIG. 6A, albeit in terms of a single electrode system. The gain relationship in the present case is the same. The utility of a signal cancellation means 405 is described by the present inventor in U.S. Pat. No. 4,879,461, as well as in U.S. Pat. No. 5,730,165. The disclosure of U.S. Pat. No. 4,879,461 is herein incorporated by reference. The purpose of signal cancellation is to reduce the voltage (i.e. charge) build-up on the charge integrator 402 concurrently with the generation of each burst (positive going transition of the drive channel), so as to permit a higher coupling between the driven column electrodes and the receiving row electrodes. One benefit of this approach is to allow a large sensing area that is sensitive to small deviations in coupling between the electrodes at relatively low cost. Such large sense couplings are present in physically large electrodes typically used in human touch sensing pads. Charge cancellation permits measurement of the amount of coupling with greater linearity, because linearity is dependent on the ability of the coupled charge from the driven column electrode 100 to the sensing row electrode 104 to be sunk into a 'virtual ground' node over the course of a burst. If the voltage on the charge integrator 402 were allowed to rise appreciably during the course of a burst, the voltage would rise in inverse exponential fashion. This exponential component has a deleterious effect on linearity and hence on available dynamic range.

Figure 7:
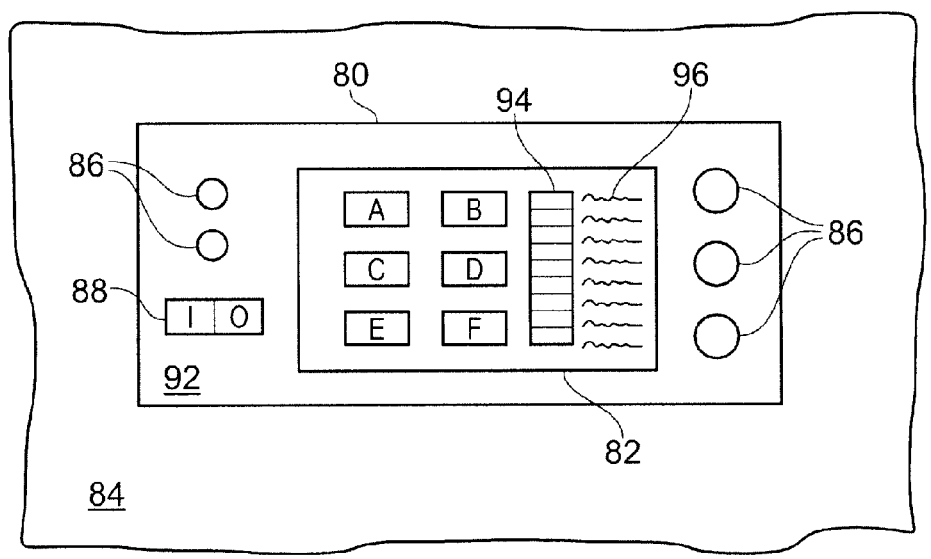
FIG. 7 schematically shows a touch sensitive display screen incorporating a sensor according to an embodiment of the invention.

FIG. 7 schematically shows in plan view a control panel 80 incorporating a touch sensitive display 82 of the kind described shown in FIG. 3B. The control panel 80 is mounted in a wall 84 of a device being controlled, in this case a washing machine. The cover panel 92 of the touch sensitive display 82 extends over the whole area of the control panel with the region occupied by the touch sensitive display located, in this example, near to the middle of the control panel. The touch sensitive display is shown in FIG. 7 with a display that shows a number of menu button labeled A to F, e.g. corresponding to different washing programs that may be selected, a sliding scale 94 for defining a variable parameter, e.g. a washing temperature, and some lines of text 96 displayed to a user for information. Thus a user may, for example, select a washing program by touching the control panel in the region of the menu buttons labeled A to F. The sensor comprising the touch sensitive display may be configured such that the positions of the menu buttons A-F correspond to the locations of "keys" in the sensor (i.e. the region of the intersections between column and row electrodes). Alternatively, the menu buttons A-F may not be directly related to the arrangement of the underlying keys of the sensor and may be arbitrarily defined. In the latter case the position of a touch within the sensitive area may be determined from an interpolation of the signals from a number of keys, the position then being compared with the positions of the displayed menu buttons to determine if one has been selected. A selection of a temperature from the sliding temperature scale 82 displayed to a user can be made in the same way.

In addition to the touch sensitive display 82, the control panel also includes a number of additional buttons 86 and an on/off switch 88. These may be touch sensitive keys or conventional mechanical button switches. In this example they are touch sensitive keys which preserve the flat and sealed outer surface of the control panel. Because in this case the additional buttons are not required to be transparent, there is no need for them to be formed from ITO. Accordingly, cheaper and less resistive copper electrodes may be used for these buttons. Furthermore, a single sensor controller integrated circuit chip may conveniently be used to control the position sensor comprising the transparent sensor and the more convention copper electrode touch sensitive buttons 86, 88. This can be achieved, for example, by appropriate calibration of the different channels of the single controller chip to take account of the different resistance and loading of the ITO film and the copper electrodes.

Figures 8, 9:
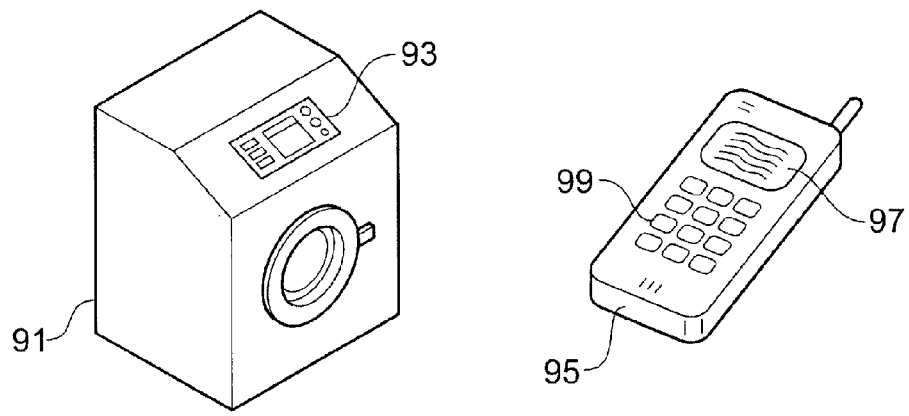
FIG. 8 schematically shows a washing machine incorporating a sensor according to an embodiment of the invention.
FIG. 9 schematically shows a cellular telephone incorporating a sensor according to an embodiment of the invention.

Thus a designer is afforded a great deal of freedom in designing a control panel incorporating a transparent touch sensitive position sensor and it will be appreciated that the principles described above are applicable to many types of device/appliance. For example, similar sensors can be used with ovens, grills, washing machines, tumble-dryers, dishwashers, microwave ovens, food blenders, bread makers, drinks machines, computers, home audiovisual equipment, portable media players, PDAs, cell phones, computers, and so forth. For example, FIG. 8 schematically shows a washing machine 91 incorporating a sensor 93 according to an embodiment of the invention and FIG. 9 schematically shows a cellular telephone 95 incorporating a sensor 99 according to an embodiment of the invention and a screen 97. More generally the invention may be used in conjunction with any appliance having a human-machine interface. It is also possible to provide a sensor similar to those kind described above which is provided separately from a device/appliance which it may be used to control. For example to provide an upgrade to a pre-existing appliance. It is also possible to provide a generic sensor which may be configured to operate a range of different appliances. For example, a sensor having a given range of keys which a device/appliance provider may associated with functions of an apparatus as he wishes by appropriately configuring a controller, for example, by reprogramming.

Figure 10A:
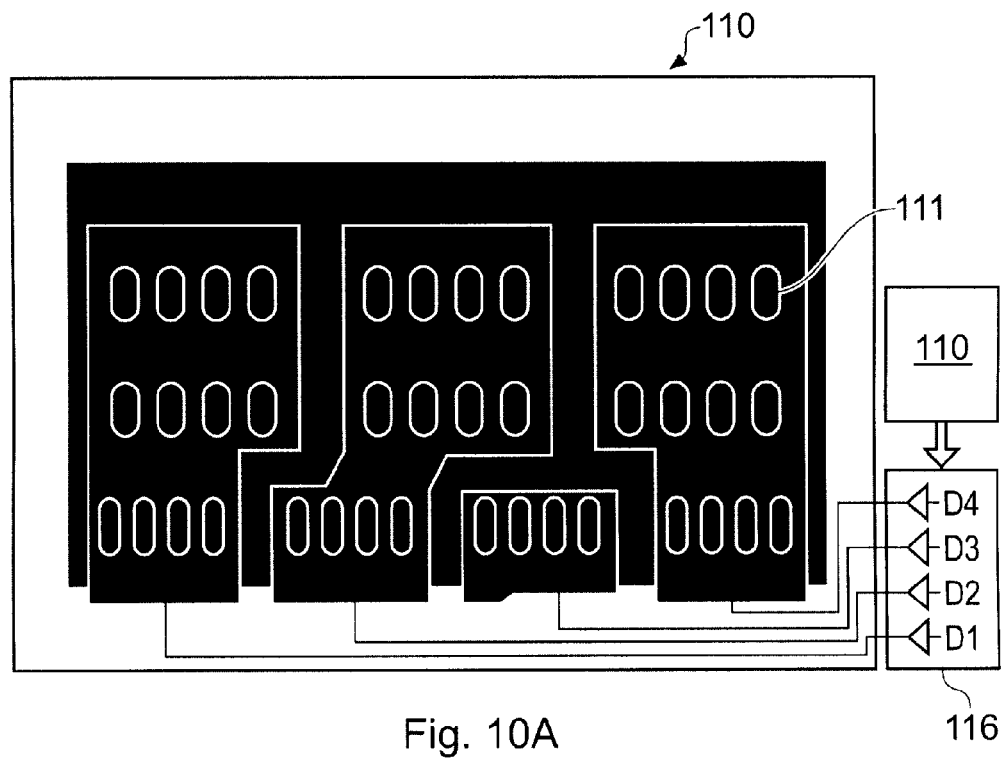
FIGS. 10A and 10B schematically show respective front and rear plan views of a two dimensional capacitive position sensor according to another embodiment of the invention.
Figure 10B:
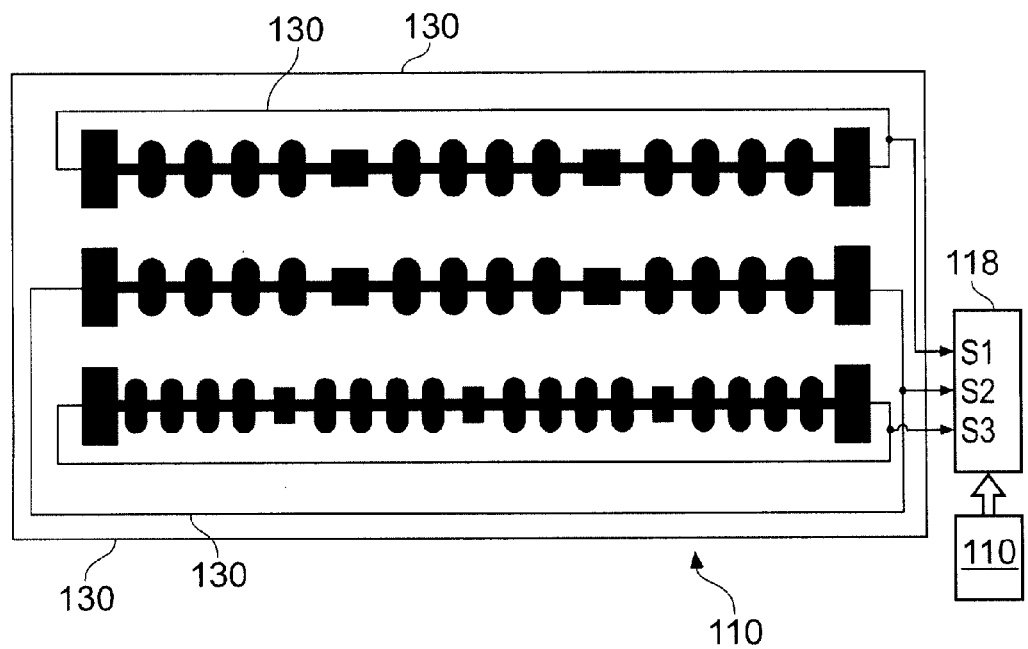

FIGS. 10A and 10B schematically show respective front and rear plan views of a two dimensional capacitive position sensor 110 according to another embodiment of the invention. This might be used, for example, in a cooker control panel. The sensor 110 is similar to that shown in FIGS. 5A and 5B in that it provides the same arrangement of keys. That is to say the sensor 110 has two upper rows of three keys and a single lower row of four keys. However, the electrode patterning for the keys is different. The keys of the sensor shown in FIGS. 5A and 5B are based on a diamond-shaped pattern of overlapping open and filled areas, with each row electrode formed from four sub-rows of conductive material. However, the keys of the sensor 110 shown in FIGS. 10A and 10B are based on a pattern comprising regions in the form of rounded-slots, and furthermore, each row electrode comprises a single rows of conductive material. Furthermore still, in this embodiment the openings in the column electrodes contain areas of conductive material 111. These areas are electrically isolated from the surrounding electrode material and so do not affect the way in which the sensor operates. However, from an aesthetic point of view, it can be better to include these areas of conductive material 111 in transparent sensors because it can help make the layer of conductive material comprising the electrodes appear less visible to the user because of the more uniform covering. The two ends of each of the respective row electrodes are connected together by shorting connections 130 which are similar to and will be understood from those described above.

Notwithstanding the differences in the specific pattern of conducting material forming the electrodes, the sensor 110 shown in FIGS. 10A and 10B operates in the same general manner, and will be understood from, the sensor shown in FIGS. 1A and 1B. Thus also shown in FIG. 10A is a drive unit 116 and a sensor controller 110. The drive unit 116 differs from the drive unit 6 shown in FIG. 1A in that it comprises four (as opposed to three) drive channels D1, D2, D3, D4. This is because one of the rows of keys for the sensor 110 (namely the bottom row for the orientation shown in FIG. 10A) comprises four key areas and four drive channels are required to service this row. This difference apart, the drive unit 116 operates in a similar way, and will be understood from, the drive unit shown in FIG. 1A. Similarly, FIG. 10B shows a sense unit 118 and again the sensor controller 110. The sense unit operates in a similar way, and will be understood from, the sense unit 8 shown in FIG. 1B.

The sensor controller 110 operates in broadly the same manner as the sensor controller 10 shown in FIGS. 1A and 1B. However, differences in the associated key arrangements means that different logic is required to determine which key is being touched. For the sensor 110 shown in FIGS. 10A and 10B, if signals are detected by sense channels S1 or S2 (the upper two rows), the selected key area will depend on which of drive channels D1, D2, D3 or D4 is active. (It is noted that drive channel D2 cannot give rise to a sense signals on sense channels S1 or S2 because the column electrode connected to drive channel D2 does not overlap the row electrodes connected to these sense channels.) If, on the other hand, a signal is detected by sense channel S3 (the bottom row), the selected key area will depend on which of drive channels D1, D2, D3 or D4 is active.

Figure 11A:
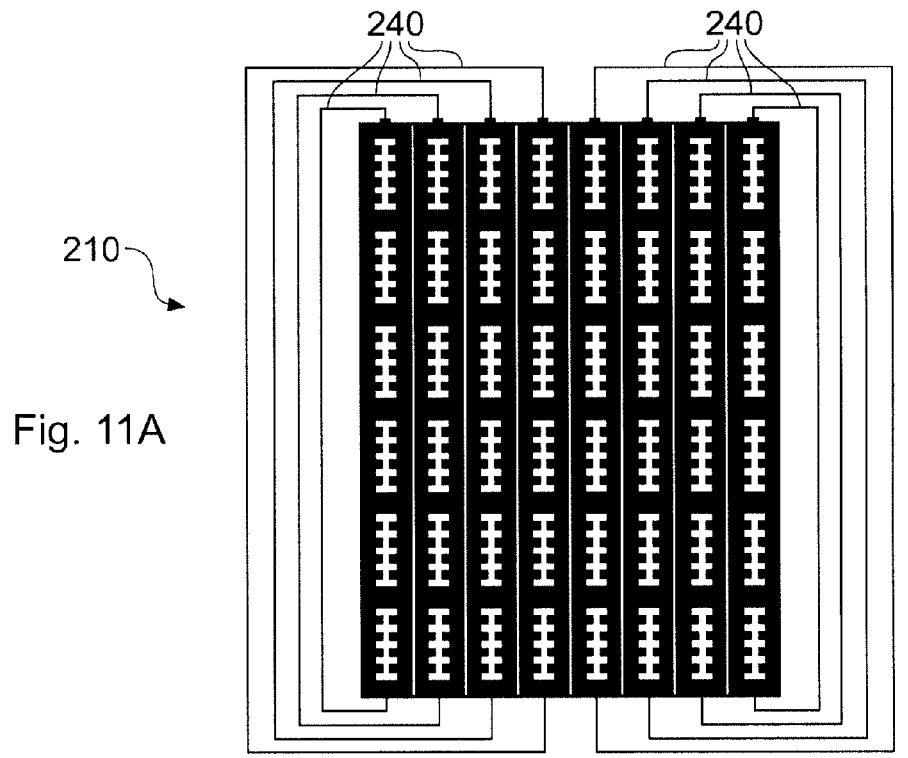
FIGS. 11A and 11B schematically show respective front and rear plan views of a two dimensional capacitive position sensor according to a further embodiment of the invention.
Figure 11B:
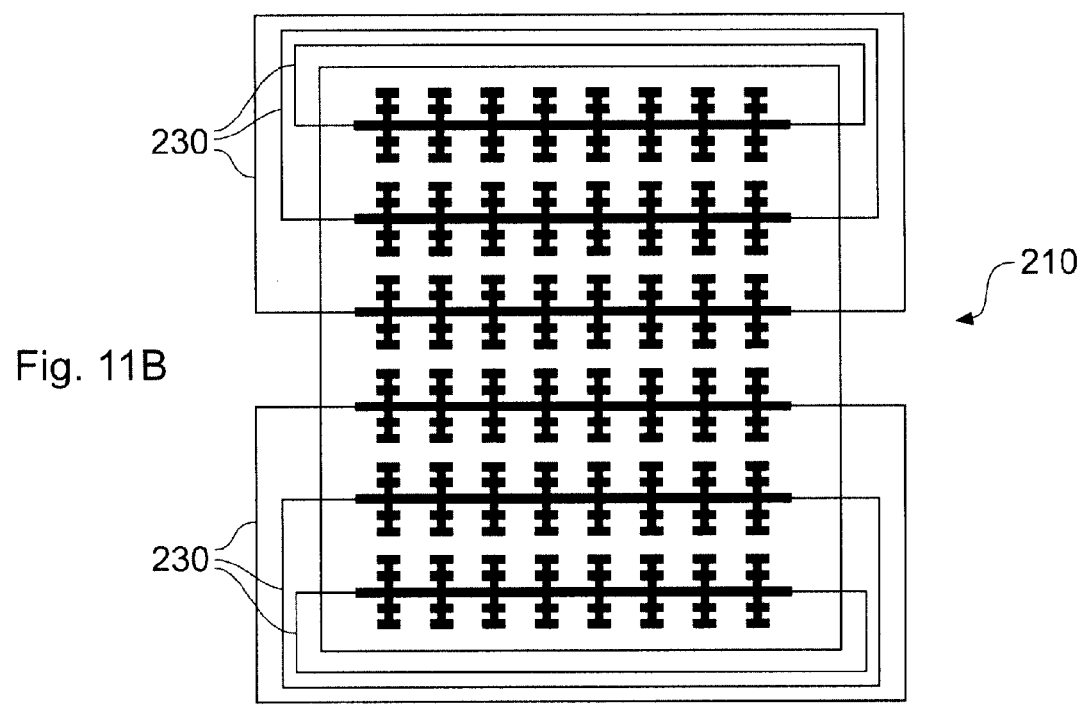

FIGS. 11A and 11B schematically show respective front and rear plan views of a two dimensional capacitive position sensor 210 according to another embodiment of the invention. The sensor shown in FIGS. 11A and 11B again operates in a manner which is overall similar to that shown in FIGS. 1A and 1B, but is again based on a different key configuration. In this case an array of six rows and eight columns of keys (48 key areas in total) is provided. Thus the corresponding drive unit (not shown) comprises eight drive channels coupled to the eight column electrodes and the corresponding sense unit (not shown) comprises six sense channels coupled to the six row electrodes. As in the embodiments described above, the location of a touch is determined from the intersection of the column electrode connected to the active drive channel and the sense electrode connected to the sense channel which sees a signal.

In addition to the increased number of rows and columns, the electrode pattern for the sensor 210 shown in FIGS. 11A and 11B is different from that of the sensor 2 shown in FIGS. 1A and 1B in that the column electrodes are not separated by ground shielding. Furthermore, the keys of the sensor shown in FIGS. 1A and 1B are based on a diamond-shaped pattern of open and filled areas, with each row electrode formed from four sub-rows of conductive material. However, the keys of the sensor 210 shown in FIGS. 11A and 11B are based on open and filled regions in the form of connected rectangles, with each row electrode comprising only a single row (as opposed to a number of sub rows) of conductive material.

The two ends of each of the respective row electrodes shown in FIG. 11B are connected together by shorting connections 230 which are again similar to, and will be understood from, those described above. In addition, the ends of each of the respective column electrodes shown in FIG. 11A are also connected together by column shorting connections 240. These are used to reduce the electrical impedance presented to the drive channels in the same way as the shorting connections 230 between the ends of the row electrodes are used to reduce the electrical impedance presented to the sense channels. This can be particularly useful for relatively large area sensors, or sensors where the key areas are narrow, because the resistance of the column electrodes, as well as the row electrodes, can then become significant. Accordingly, the sensor 210 shown in FIGS. 11A and 11B might be particularly suitable for larger touch screens, such as might be used in a point of sale terminal, e.g. on the order of 16 cm by 12 cm, or so.

Although the above has described sensors in terms of driven column electrodes and sensing row electrodes, it will be appreciated that these may be reversed without changing the underlying principles of operation. For example, the sensor 2 shown in FIG. 2 could equally be operated by connecting the row electrodes to drive channels and the column electrodes to sense channels. Furthermore, the substrate 4 can be reversed such that the side referred to above as the rear side is arranged on the user-facing side of the substrate during normal use. It will, however, be appreciated that the degree of spilling of electric fields may not be the same on either side of the substrate since it will generally depend on the patterning of the electrodes on either surface. Thus it may be beneficial for the electrode patterning having the greatest degree of spilling to be on the side of the substrate that faces the object to be sensed (e.g. a user's finger or a stylus) during normal use. It has also been found experimentally that improved sensitivity can be obtained if the sense electrodes are located on the side of the substrate that faces the object to be sensed during normal use. For example, a doubling of measured signal strength has been seen compared to the case that the driven electrodes face the object to be detected.

Furthermore, rather than relying on a transmit-receive arrangement (i.e. employing drive and sense electrodes), the substrate, electrode patterning and shorting connection arrangements described above may also be used in a passive configuration. That is to say, rather then have drive channels applying drive signals to drive electrodes and sense channels detecting sense signals induced in sense electrodes by the drive signals, each of the electrodes could be connected to a single-electrode capacitance sensing channel (for example as described in U.S. Pat. No. 5,730,165). With this arrangement the respective rows and columns of electrodes independently sense the position of the object along two corresponding directions. For example, with reference to the embodiment shown in FIGS. 5A and 5B, the three column electrodes of FIG. 5A and the three row electrodes of FIG. 5B could each be connected to identical single-electrode capacitance sensing channels. Signals associated with the column electrodes of FIG. 5A can thus be used to identify the position of a touch in the horizontal direction (for the orientation shown in FIG. 5A), while signals associated with the row electrodes of FIG. 5B may be used to identify the position of an object in the vertical direction.

Finally, it is noted that although the term "touch" is frequently used in the above description, a sensor of the kind described above can be sufficiently sensitive that it is able to register the location of an adjacent finger (or other object such as a stylus) without requiring physical contact. The term "touch" as used herein should therefore be interpreted accordingly.

What is claimed is:

1. A capacitive sensor comprising:
    a substrate;
    a first electrode on a first surface of the substrate, the first electrode comprising:
        a first continuous portion of electrode material substantially extending across a sense area of the capacitive sensor, and
        a first opening; and
    a second electrode on a second surface of the substrate, the second surface opposite the first surface, the second electrode being electrically insulated from the first electrode by the substrate, the first and second electrodes configured to capacitively couple a charge between the first and second electrodes, the second electrode comprising:
        a second continuous portion of electrode material substantially extending across the sense area of the capacitive sensor; and
        a filled region configured to align with the first opening of the first electrode.

2. The capacitive sensor of claim 1, comprising a first shorting connection configured to connect between at least two locations on the first electrode.

3. The capacitive sensor of claim 2, comprising a second shorting connection configured to connect between at least two locations on the second electrode.

4. The capacitive sensor of claim 1, wherein the first opening includes a third portion of electrode material within the first opening, the third portion of electrode material electrically isolated from the first and second electrodes.

5. The capacitive sensor of claim 1, comprising a third electrode on the first surface of the substrate.

6. The capacitive sensor of claim 5, comprising a ground electrode disposed between the first electrode and the third electrode.

7. The capacitive sensor of claim 1, comprising a third electrode on the second surface of the substrate.

8. The capacitive sensor of claim 7, comprising a ground electrode disposed between the second electrode and the third electrode.

9. The sensor of claim 1, comprising:
    a third electrode on the first surface of the substrate; and
    a fourth electrode on the second surface of the substrate.

10. The capacitive sensor of claim 1, comprising a drive channel operable to apply electrical drive signals to one of the first or second electrodes and a sense channel operable to detect, in response to the drive signal, electrical sense signals induced in the other of the first or second electrodes.

11. The capacitive sensor of claim 10, wherein the drive channel comprises a switch element operable to selectively connect and disconnect, to a voltage source, the electrode to which the drive channel is operable to apply electrical drive signals.

12. The capacitive sensor of claim 11, wherein the sense channel is associated with the electrode on the surface of the substrate that faces an object to be sensed during normal use.

13. The capacitive sensor of claim 10, wherein the sense channel comprises a charge transfer circuit.

14. A control panel comprising:
    a capacitive sensor comprising:
        a substrate;
        a first electrode on a first surface of the substrate, the first electrode comprising:
            a first continuous portion of electrode material substantially extending across a sense area of the capacitive sensor, and
            a first opening, the substrate being solid in a region configured to align with the first opening of the first electrode; and
        a second electrode on a second surface of the substrate, the second surface opposite the first surface, the second electrode comprising:
            a second continuous portion of electrode material substantially extending across the sense area of the capacitive sensor; and
            a filled region configured to align with the first opening of the first electrode.

15. The control panel of claim 14, comprising a first a shorting connection configured to connect between at least two locations on the first electrode.

16. The control panel of claim 15, comprising a second shorting connection configured to connect between at least two locations of the second electrode.

17. The control panel of claim 14, wherein the first opening includes a third portion of electrode material within the first opening, the third portion of electrode material electrically isolated from the first and second electrodes.

18. The control panel of claim 14, wherein the cover panel and the capacitive sensor are attached to one another by a refractive index matching adhesive.

19. The control panel of claim 14, further comprising a display screen underlying the capacitive sensor.

20. The control panel of claim 19, wherein the display screen and the capacitive sensor are attached to one another by a refractive index matching adhesive.

21. An apparatus comprising:
    a capacitive sensor comprising:
        a substrate;

a first electrode on a first surface of the substrate, the first electrode comprising:
  a first continuous portion of electrode material substantially extending across a sense area of the capacitive sensor, and
  a first opening, the substrate being solid in a region configured to align with the first opening of the first electrode; and
a second electrode on a second surface of the substrate, the second surface opposite the first surface, the second electrode comprising:
  a second continuous portion of electrode material substantially extending across the sense area of the capacitive sensor; and
  a filled region configured to align with the first opening of the first electrode;
a cover panel overlying the capacitive sensor; and
a processing unit.

* * * * *